(12) United States Patent
Wood et al.

(10) Patent No.: US 9,936,263 B2
(45) Date of Patent: Apr. 3, 2018

(54) CONTROLLING DISPLAY OF MEDIA CONTENT

(71) Applicant: Roku, Inc., Los Gatos, CA (US)

(72) Inventors: Anthony Wood, Palo Alto, CA (US); Scott Rosenberg, Glen Ridge, NJ (US); Ilya Asnis, San Jose, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 15/283,932

(22) Filed: Oct. 3, 2016

(65) Prior Publication Data

US 2017/0195743 A1 Jul. 6, 2017

Related U.S. Application Data

(60) Provisional application No. 62/272,753, filed on Dec. 30, 2015.

(51) Int. Cl.

| H04N 5/445 | (2011.01) |
|---|---|
| H04N 21/6587 | (2011.01) |
| H04N 7/16 | (2011.01) |
| H04N 7/173 | (2011.01) |
| H04N 21/234 | (2011.01) |
| H04N 21/2387 | (2011.01) |
| H04N 21/2543 | (2011.01) |
| H04N 21/6437 | (2011.01) |

(Continued)

(52) U.S. Cl.
CPC ......... *H04N 21/6587* (2013.01); *H04N 7/165* (2013.01); *H04N 7/17318* (2013.01); *H04N 21/2387* (2013.01); *H04N 21/23424* (2013.01); *H04N 21/2543* (2013.01); *H04N 21/2547* (2013.01); *H04N 21/47217* (2013.01); *H04N 21/6437* (2013.01); *H04N 21/812* (2013.01)

(58) Field of Classification Search
CPC ......... H04N 21/23424; H04N 21/2387; H04N 21/44222; H04N 21/454
See application file for complete search history.

(56) References Cited

U.S. PATENT DOCUMENTS

| 5,597,307 A * | 1/1997 | Redford | ................ | G06F 3/0605 |
|---|---|---|---|---|
| | | | | 348/E5.103 |
| 8,005,713 B1 * | 8/2011 | Sanz-Pastor | ......... | B01D 50/002 |
| | | | | 705/14.1 |

(Continued)

OTHER PUBLICATIONS

International Search Report and Written Opinion directed to related International patent application No. PCT/US2016/066906, dated Mar. 2, 2017; 12 pages.

*Primary Examiner* — Pankaj Kumar
*Assistant Examiner* — Timothy Newlin
(74) *Attorney, Agent, or Firm* — Sterne, Kessler, Goldstein & Fox, PLLC

(57) ABSTRACT

Disclosed herein are system, apparatus, article of manufacture, method, and/or computer program product embodiments for controlling display of media content. An embodiment operates by receiving a selection of media content for playback, presenting interstitial media content on a first device prior to playing the media content, transmitting an option to skip the interstitial media content to a second device, receiving a request to skip the interstitial media content from the second device, stopping presentation of the interstitial media content on the first device, and presenting the selected media content on the first device.

20 Claims, 11 Drawing Sheets

(51) Int. Cl.
*H04N 21/81* (2011.01)
*H04N 21/2547* (2011.01)
*H04N 21/472* (2011.01)

(56) References Cited

U.S. PATENT DOCUMENTS

| | | | |
|---|---|---|---|
| 2002/0044762 A1* | 4/2002 | Wood | G11B 27/005 386/343 |
| 2002/0057893 A1 | 5/2002 | Wood et al. | |
| 2002/0090198 A1 | 7/2002 | Rosenberg et al. | |
| 2003/0031455 A1* | 2/2003 | Sagar | G06Q 30/0247 386/234 |
| 2003/0202773 A1* | 10/2003 | Dow | G06F 17/30787 386/251 |
| 2003/0231854 A1* | 12/2003 | Derrenberger | H04N 7/173 386/262 |
| 2005/0235331 A1* | 10/2005 | Lynch | H04N 5/4403 725/100 |
| 2007/0098357 A1* | 5/2007 | McEnroe | H04N 5/76 386/343 |
| 2008/0092159 A1* | 4/2008 | Dmitriev | G06Q 30/0269 725/34 |
| 2009/0222850 A1* | 9/2009 | Darnell | H04N 5/76 725/32 |
| 2011/0078740 A1* | 3/2011 | Bolyukh | H04N 5/44543 725/41 |
| 2011/0088057 A1* | 4/2011 | Udani | G06Q 30/02 725/32 |
| 2012/0084809 A1* | 4/2012 | Schultz | G06Q 30/00 725/34 |
| 2013/0198013 A1* | 8/2013 | Shehan | G06Q 30/02 705/14.73 |
| 2015/0095932 A1* | 4/2015 | Ren | H04N 21/4383 725/22 |

* cited by examiner

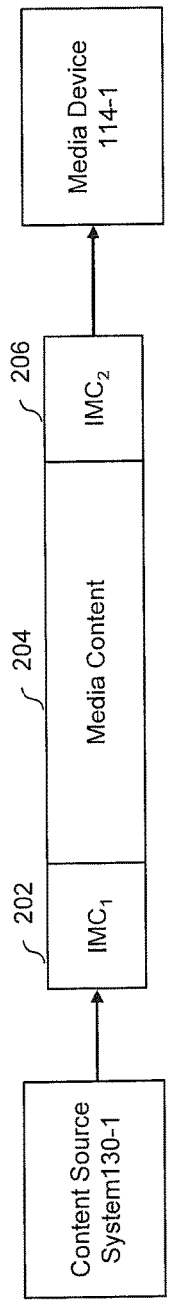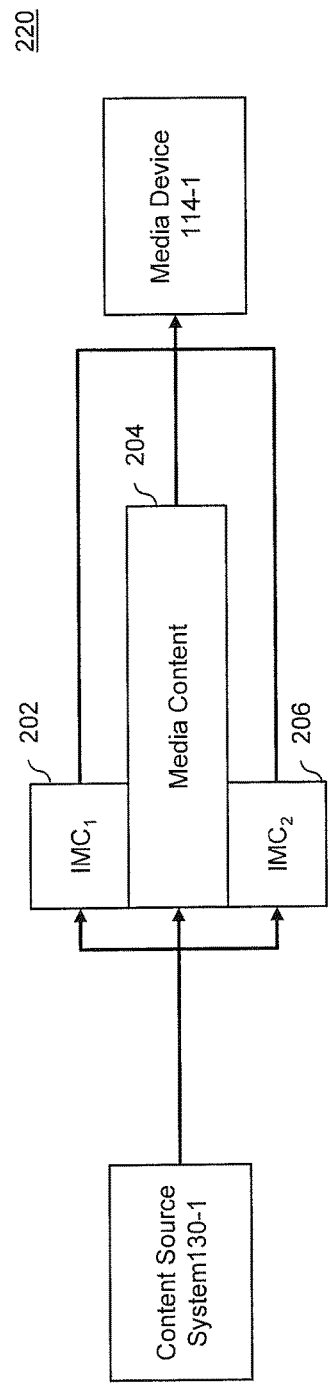
FIG. 2A
FIG. 2B

FIG. 5

User Bid Profile Table — 502
- user_id
- balance
- bid_amount_1
- bid_media_content_id_1
- bid_amount_2
- bid_media_content_id_2
- ...
- bid_amount_$n$
- bid_media_content_id_$n$

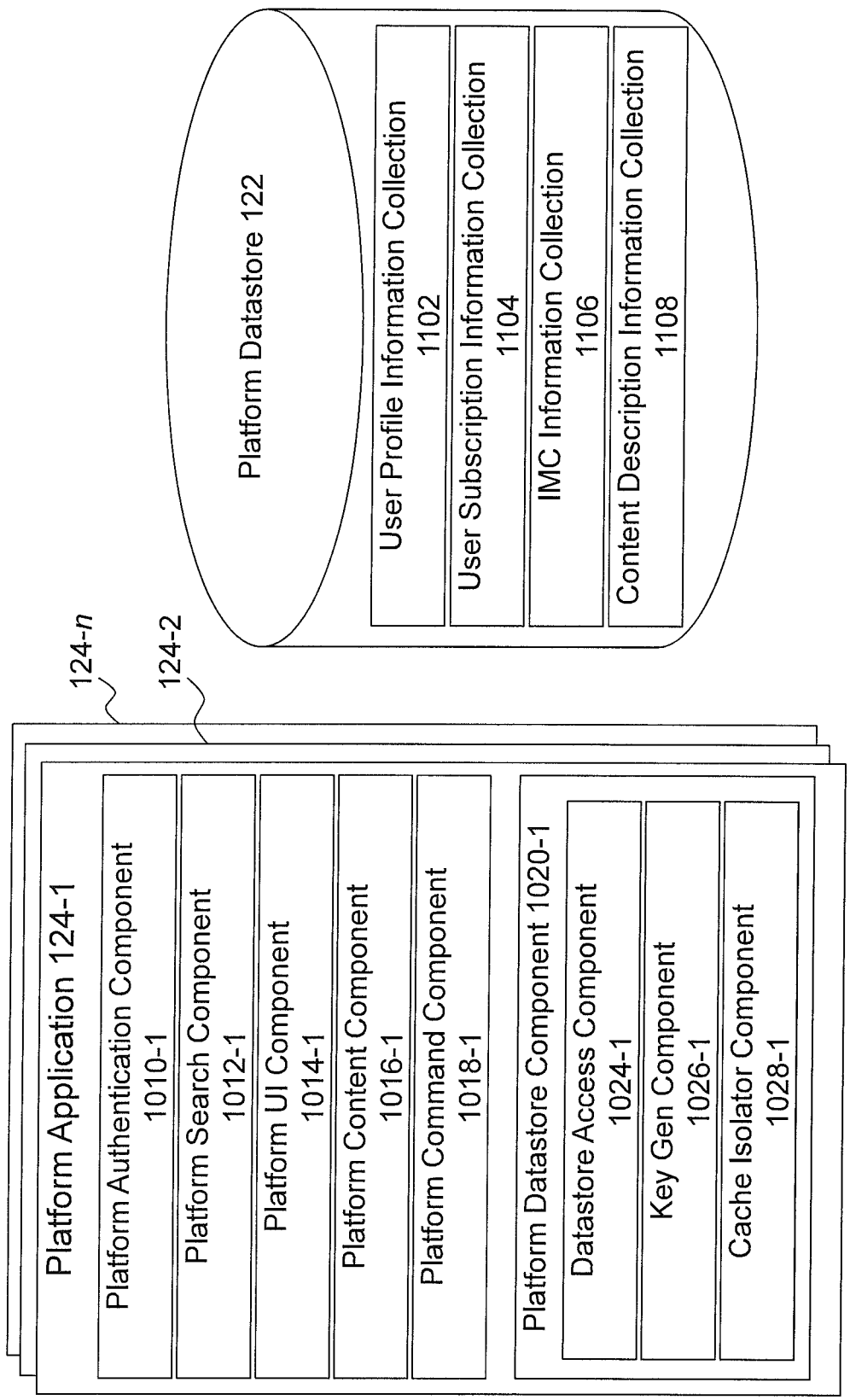

CONTROLLING DISPLAY OF MEDIA CONTENT

CROSS-REFERENCE TO RELATED APPLICATION

This application claims priority to U.S. Provisional Patent Application No. 62/272,753, filed on Dec. 30, 2015, which is herein incorporated by reference in its entirety.

BACKGROUND

Field

This disclosure is generally directed to controlling display of media content. More particularly, this disclosure relates to controlling display of media content using separate devices.

Background

Consumer electronics such as, for example, high definition audio and/or video playback devices, can generally enable a user or consumer to watch or listen to their favorite content by receiving or streaming the content for playback on their devices. But often, the user receives additional content beyond the requested content. For example, the user may receive a branding announcement prior to the start or during a stream, a warning, such as a copyright or content warning, public service information, a programming announcement, etc. However, when users select such streaming content, the user typically desires the content to be played as soon as possible, and with minimal interruption. In other words, the user has an incentive to skip the additional content, or prevent the additional content from being delivered. On the other hand, a content provider has a desire to present the additional content to the user. Thus, there can be a tradeoff between a content provider who wants to present the additional content and the desires of a user.

Conventional systems fail to adequately address this trade off. First, a user may be willing or unwilling to view additional content when selecting content for playback. But the decision of whether to view additional content has usually been dictated by the platform itself. For example, a user might be willing to watch broadcast television with the expectation of seeing additional content during shows, or the user may subscribe to a service that presents free content.

Second, a user may be more or less willing to view additional content such as advertisements based on the value of the content selected for playback. For example, a user may be willing to pay more money to skip such additional content while watching a popular television series such as GAME OF THRONES®. Similarly, a content provider may be less interested in charging a user to skip additional content for an unpopular television show such as a historical documentary. But conventional systems do not enable a user to make a decision about whether to view additional content based on the value of the content selected for playback. Instead, conventional systems may, for example, enable a user to pay a flat monthly fee to view content of interest without viewing additional content. Alternatively, conventional systems may enable a user to pay a reduced monthly fee to view content of interest while only viewing a modest amount of additional content. In these conventional systems, there is a disconnect between the particular content selected for playback and the additional content to suppress in view of the fee being charged. In other words, such conventional systems determine whether a user can skip additional content independent of the particular content selected for playback.

Finally, conventional systems do not allow a user to interactively opt-out of additional content as the need arises. Rather the decision to opt-out is dictated in advance of the user selecting particular content for playback. In summary, such conventional systems fail to adequately address the interests of operators, content providers, and users.

SUMMARY

Provided herein are system, apparatus, article of manufacture, method and/or computer program product embodiments, and/or combinations and sub-combinations thereof, for controlling display of media content.

An embodiment includes a system for controlling media content. The system can include at least one processor and a memory coupled to the at least one processor and configured to receive a selection of media content for playback, present interstitial media content on a first device prior to playing the media content, transmit an option to skip the interstitial media content to a second device, receive a request to skip the interstitial media content from the second device, stop presentation of the interstitial media content on the first device, and present the selected media content on the first device.

Another embodiment includes a computer implemented method for a controlling media content. The method can operate by receiving a selection of media content for playback, presenting interstitial media content on a first device prior to playing the media content, transmitting an option to skip the interstitial media content to a second device, receiving a request to skip the interstitial media content from the second device, stopping presentation of the interstitial media content on the first device, and presenting the selected media content on the first device.

A further embodiment includes a tangible computer-readable device having instructions stored thereon that, when executed by at least one computing device, causes the at least one computing device to perform operations. The operations can include receiving a selection of media content for playback, presenting interstitial media content on a first device prior to playing the media content, transmitting an option to skip the interstitial media content to a second device, receiving a request to skip the interstitial media content from the second device, stopping presentation of the interstitial media content on the first device, and presenting the selected media content on the first device.

BRIEF DESCRIPTION OF THE FIGURES

The accompanying drawings are incorporated herein and form a part of the specification.

FIGS. 2A-B illustrate block diagrams of example media delivery schemes, in accordance with one or more embodiments.

FIG. 5 illustrates a block diagram of example user bid profile database table, in accordance with one or more embodiments.

FIG. 10 illustrates block diagrams of a platform server device(s) including platform application(s) according to an example embodiment.

FIG. 11 illustrates a block diagram of a platform datastore configured according to an example embodiment.

Figure 1:
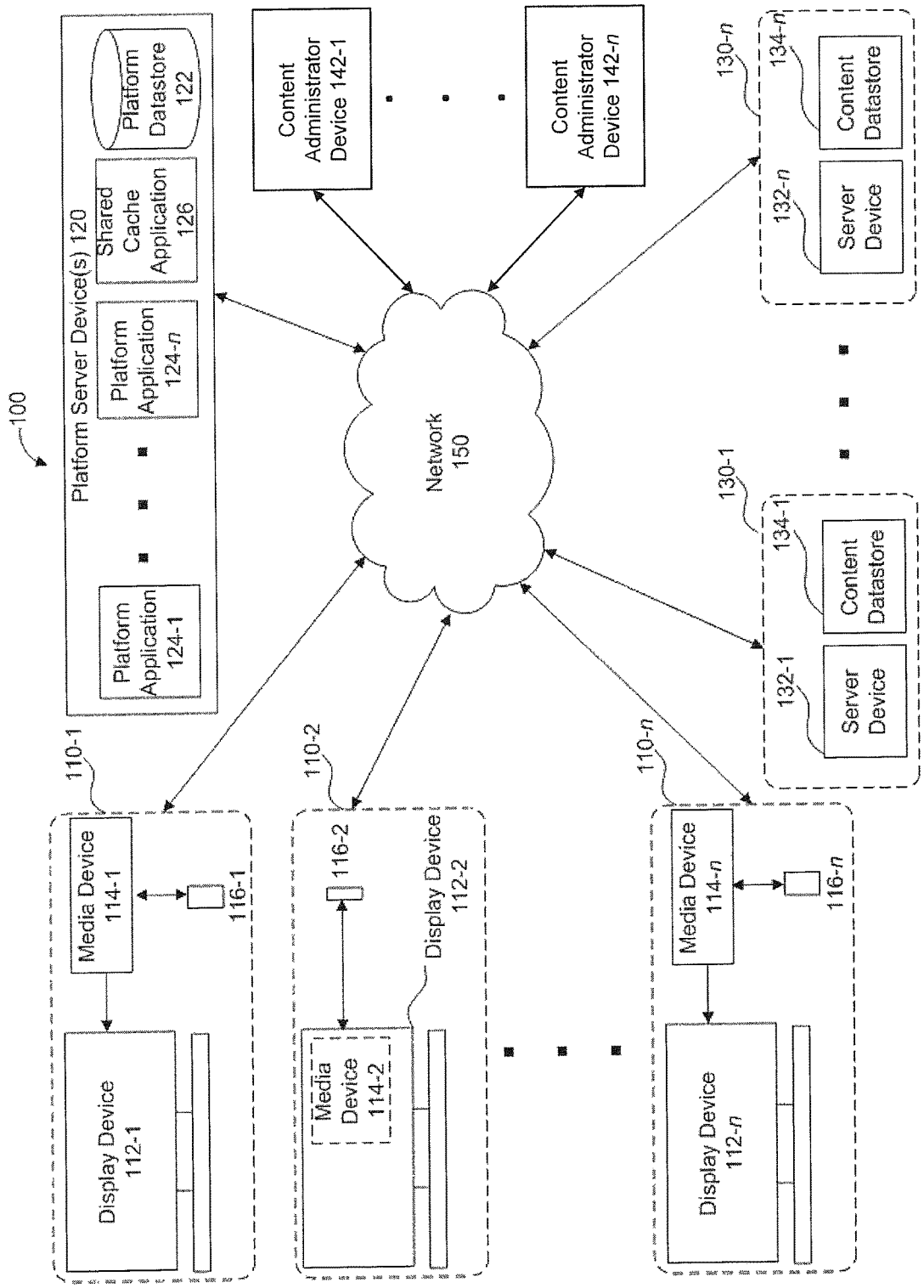
FIG. 1 illustrates a block diagram of a media control system according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 114-*n* can include elements 114-1, 114-2, 114-3, and 114-4. Furthermore, unless explicitly stated otherwise, a complete set of elements can vary for a given feature, embodiment, and/or implementation even though the same designator can be used between various features, embodiments, and/or implementations.

DETAILED DESCRIPTION

FIG. 1 illustrates a block diagram of a media control system 100, according to an embodiment. In particular, the media control system 100 can include one or more interface systems 110-*n*, platform server devices 120, and one or more content source systems 130-*n*. In some embodiments, the interface systems 110-*n* can include, without limitation, display devices 112-*n* (e.g. a monitor, television, a projector, etc.), media devices 114-*n* (e.g. streaming devices, multimedia devices, audio/video playback devices, etc.), control devices 116-*n*, and/or one or more content provider devices 142-*n*.

In some embodiments, the media devices 114-*n* can be integrated with, operatively coupled to, and/or connected to their respective display devices 112-*n*, control devices 116-*n*, and/or network 150. The media devices 150 can be configured to communicate with their respective display devices 112-*n* and network 150. In various embodiments, the network 150 can include, without limitation, a computer and/or telecommunications network which can enable coupled and/or interconnected systems and/or devices to communicate information between and among each other. In various embodiments, the network 150 can include, without limitation, intranet, extranet, Internet, and/or any other local, regional, global telecommunications network.

In some embodiments, the platform server device(s) 120 can include, without limitation, one or more platform applications 124-*n*, a platform datastore 122, and a shared cache application 126. The platform datastore 122 can be generally arranged to store platform information and for management of content, media devices, content source systems, users or consumers and further discussed with respect to FIG. 9. The platform application(s) 124-*n* can be generally arranged to provide various services to the one or more media devices 114-*n*, The various services can include, without limitation, authentication services, search services, user interface services, content services, command services, datastore services, further discussed with respect to FIG. 8. The shared cache application 126 can be generally arranged to provide a shared cache memory that can be used to cache information retrieved from platform datastore 122 and accessed by one or more media devices 114-*n* and/or platform application(s) 124-*n*. The shared cache application 126 is also further discussed with respect to FIG. 9.

Figure 8:
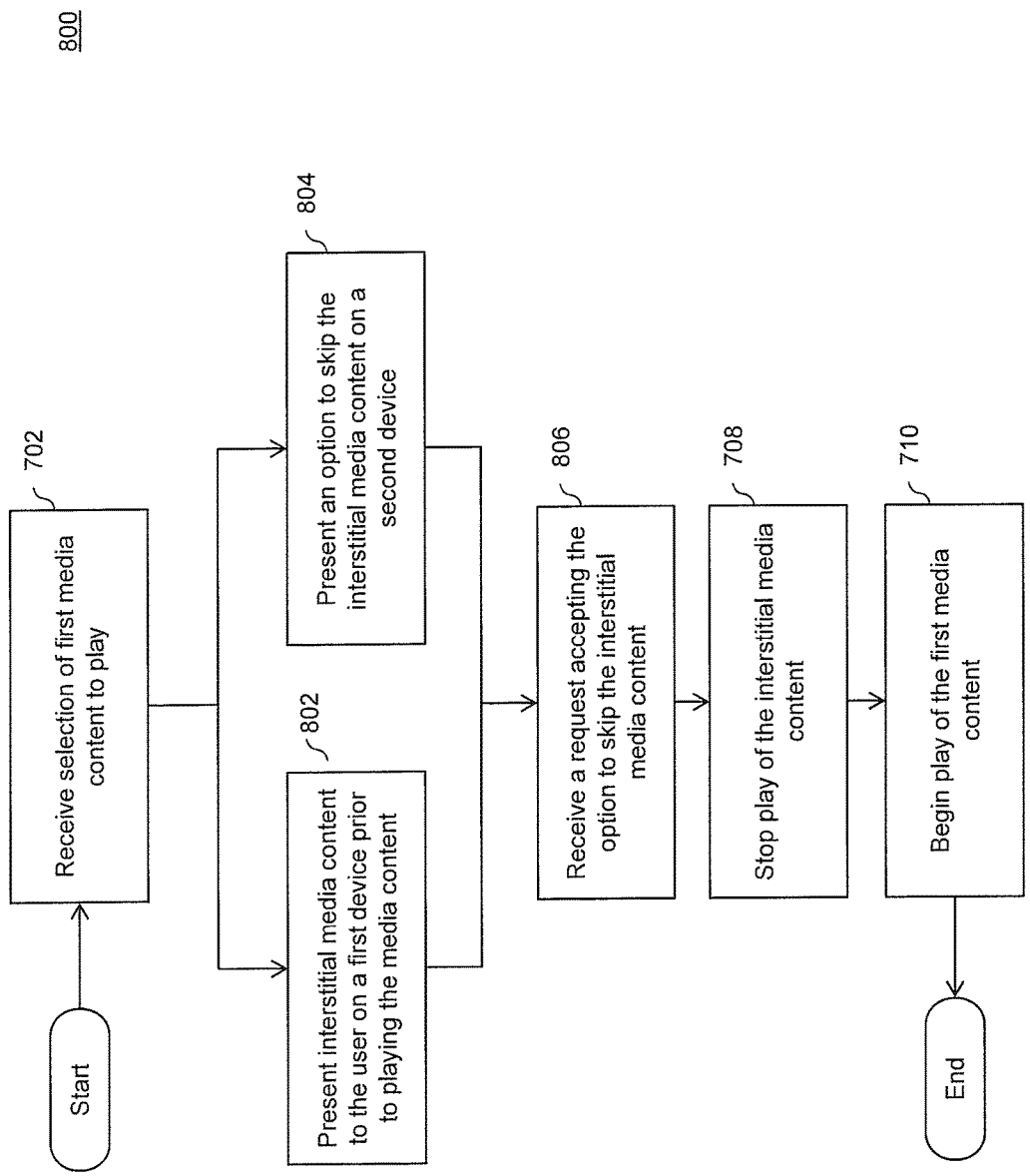
FIG. 8 illustrates a flowchart of an example method for controlling media content, in accordance with one or more embodiments.

In some embodiments, the platform server device(s) 120 can be configured to receive command information from media devices 114-*n* and can process the command information via the one or more platform applications 124-*n* further discussed with respect to FIG. 8. In some embodiments, the media devices 114-*n* can be configured to aurally and/or graphically present user interfaces and/or content on respective display devices 112-*n* including any acoustic transducers (e.g., speakers, etc.) operatively coupled to the display devices 112-*n*.

For example, the media device 114-1 can be configured to acoustically, graphically, and/or visually present content on the display device 112-1 sourced from media device 114-1, the platform server device(s) 120, and/or the one or more content source systems 130-*n*.

In addition to or alternative to the above example, the media device 114-1 can be configured to provide the one or more user interface (UI) views and/or UI elements and associated acoustic information to display device 112-1 for acoustical, graphical, and/or visual presentation, where the UI views, UI elements, and/or associated acoustic information can be generated by the platform server device(s) 120, the one or more content source systems 130-*n*, or the media device 114-1.

In some embodiments, the control devices 116-*n* can be configured to communicate user input information with the respective media devices 114-*n* and can optionally include a touch screen display (not shown) and/or audio input and/or output (I/O) circuitry. For example, the control device 116-1 can be configured to use one or more wired and/or wireless communication protocols and/or standards, which can include, without limitation, infrared (IR) protocols and/or standards, radio frequency (RF) protocols and/or standards, and/or Bluetooth protocol and/or standard to communicate with the media device 114-1. In some embodiments, the control device 116-1 can be further configured to enable a consumer or user of a media device (e.g., media device 114-1) to navigate and/or make user selections from the UI views presented on a display device (e.g., display device 112-1).

Additionally or alternatively, the control device 116-1 itself can be configured to present at least a portion of the UI views on a touch screen display (not shown) connected and/or integrated with the control device 116-1 to enable a consumer or user of media device 114-1 to navigate, select, or otherwise interact with various content as previously discussed. Examples of control devices 116-*n* can include, without limitation, remote controls and/or mobile devices.

In some embodiments, the content source systems 130-*n* can include one or more content server devices 132-*n* and associated content datastores 134-*n*. In one embodiment, content location information which can include, without limitation, network address and/or path of content stored within the content datastores 134-*n*, can be maintained within the platform server device(s) 120. In another embodiment, the network location of the content source systems 130-*n* is maintained and stored within the platform server device 120 while the specific locations of corresponding content are managed locally by the content source systems 130-*n*. In yet another embodiment, the content location information including the network location and/or path of the content source systems 130-*n* is embedded within the UI elements representative of selectable and/or viewable content displayed via the media devices 114-*n* and/or display devices 112-*n*, such that interaction with the UI elements through the media devices 114-*n* allows the selectable and/or viewable content located within the content source systems 130-*n* to be accessible to the media devices 114-*n*.

In some embodiments, the content stored within the content datastores 134-*n* can include music, video, multimedia, still pictures, text, graphics, gaming applications, and the like. In another embodiment, the particular content which is stored within the content datastores 134-*n* can be requested and provided to the media devices 114-*n* through the network 150.

By way of example, the media device 114-1 can communicate with platform server device(s) 120 to request specific content for aural and/or graphical presentation on display device 112-1. If the requested content is audio/video content, the platform server device(s) 120 can request the specific content from the one or more respective content source systems 130-*n* (e.g., content source system 226-1, etc.) via network 150, receive at least a portion of the specific content, and transmit or stream the at least a portion of the specific content to the media device 114-1 via network 150.

In addition to or alternative to the above example, the platform server device(s) 120 can provide content location information including network address and/or path of the respective content source systems 130-*n* (e.g., content source system 226-1, etc.) to the media device 114-1, and the media device 114-1 can subsequently directly request the specific content from the one or more respective content source systems 130-*n* (e.g., content source system 226-1, etc.), and receive at least a portion of the specific content transmitted or streamed by the one or more respective content source systems 130-*n* to the media device 114-1 via network 150 for aural and/or graphical presentation on display device 112-1.

In some embodiments, content administrator devices 142-*n* are computing systems that provide one or more user interfaces for receiving user parameters, respectively. Content administrator device 142-*n* can interact with platform server device(s) 120 to manipulate user preferences, such as those stored in platform datastore 122.

FIG. 2A illustrates a block diagram of example media delivery scheme 200, in accordance with one or more embodiments. Media delivery scheme 200 includes content source system 130-1, $IMC_1$ 202, media content 204, $IMC_2$ 206, and media device 114-1. Media content can include any media, for example, music, movies, TV series, audio books, and/or the like.

In media delivery scheme 200, content source system 130-1 delivers content to media device 114-1. For example, a user can request media content 204 be delivered to media device 114-1. Prior to delivering the requested media content, platform server device(s) 120 can determine that media content should be delivered with interstitial media content (IMC), even though the user did not request the IMC. For example, platform server device(s) 120 processes one or more queries to platform datastore 122 to determine whether to deliver IMC, and if so, which IMC to deliver. In the example of FIG. 2A, platform server device(s) 120 instruct content source system 130-1 to prepend $IMC_1$ 202 to media content 204 and to append $IMC_2$ 206 to media content 204 prior to delivery to media device 114-1. Then, content source system 130-1 delivers $IMC_1$ 202, media content 204, and $IMC_2$ 206, such as transcoded together in a media stream, to media device 114-1. Although FIG. 2A illustrates two IMCs in a particular arrangement, embodiments of the invention support any number or arrangement of IMCs to be delivered with media content 204.

In some embodiments, IMC includes any media content that is played prior to, during, or after requested or selected media content. For example, IMC can include a station identifier, pre-media content, a warning (such as a copyright warning, warning about explicit language and/or content in the requested media content, and/or other warning), public service announcement, programming information, an advertisement, a commercial, instructions, and/or any other content.

In some embodiments, one or more content providers (such as advertisers) may have an incentive for providing IMC to be delivered to a user, while the user may have an incentive for skipping the IMC or preventing the IMC from being delivered altogether. Hence, the providers' incentives and user's preference can be directly in conflict. But, this conflict can be leveraged to increase the revenue associated with the IMC to be presented or prevented from being presented to the user. Users (collectively or individually) can be given the ability to prevent or remove the IMC at a price and the content providers can be given the ability to compete against the users. This can occur using bidding mechanisms, fixed or variable payment systems, or any other configuration, such as those techniques described regarding FIGS. 6-9. In this manner, the priority of such additional content can be established, where such priority controls whether or not the additional content is displayed to the user.

In some embodiments, the IMC is tiered at different levels of varying values and/or importance. For example, IMC at a first level (such as an FBI copyright warning or high-valued advertisement) can be incapable of being removed by one or more users. But IMC at other levels may be capable of being removed by one or more users depending on the bid amount of the user for the IMC removal. In other words, there is a correspondence between a bid amount and a priority associated with the IMC removal or presentation.

In some embodiments, platform server devices(s) 120 determine whether and the length of IMC to include when media content 204 is requested. For example, platform server device(s) 120 can determine that IMC will be delivered (i.e., given a high priority) when an amount corresponding to a bid for placement of the IMC exceeds any or all bids to prevent the IMC from being delivered. As another example, platform server device(s) 120 may always include IMC based on policy. In yet another example, determining whether and which IMC to provide can be determined based the techniques described with respect to FIGS. 6-9.

FIG. 2B illustrates a block diagram of example media delivery scheme 220, in accordance with one or more embodiments. Media delivery scheme 220 includes content source system 130-1, $IMC_1$ 202, media content 204, $IMC_2$ 206, and media device 114-1. Media delivery scheme 220 is similar to media delivery scheme 200, except that in media delivery scheme 220, $IMC_1$ 202, media content 204, and $IMC_2$ 206 are delivered separately to media device 114-1. In the example of FIG. 220, media device 114-1 receives the separately delivered media contents and assembles transcodes them into the same media stream. For example, $IMC_1$ 202, media content 204, and $IMC_2$ 206 in media delivery scheme 220 can be ordered and delivered as shown in FIG. 2A.

Figure 3:
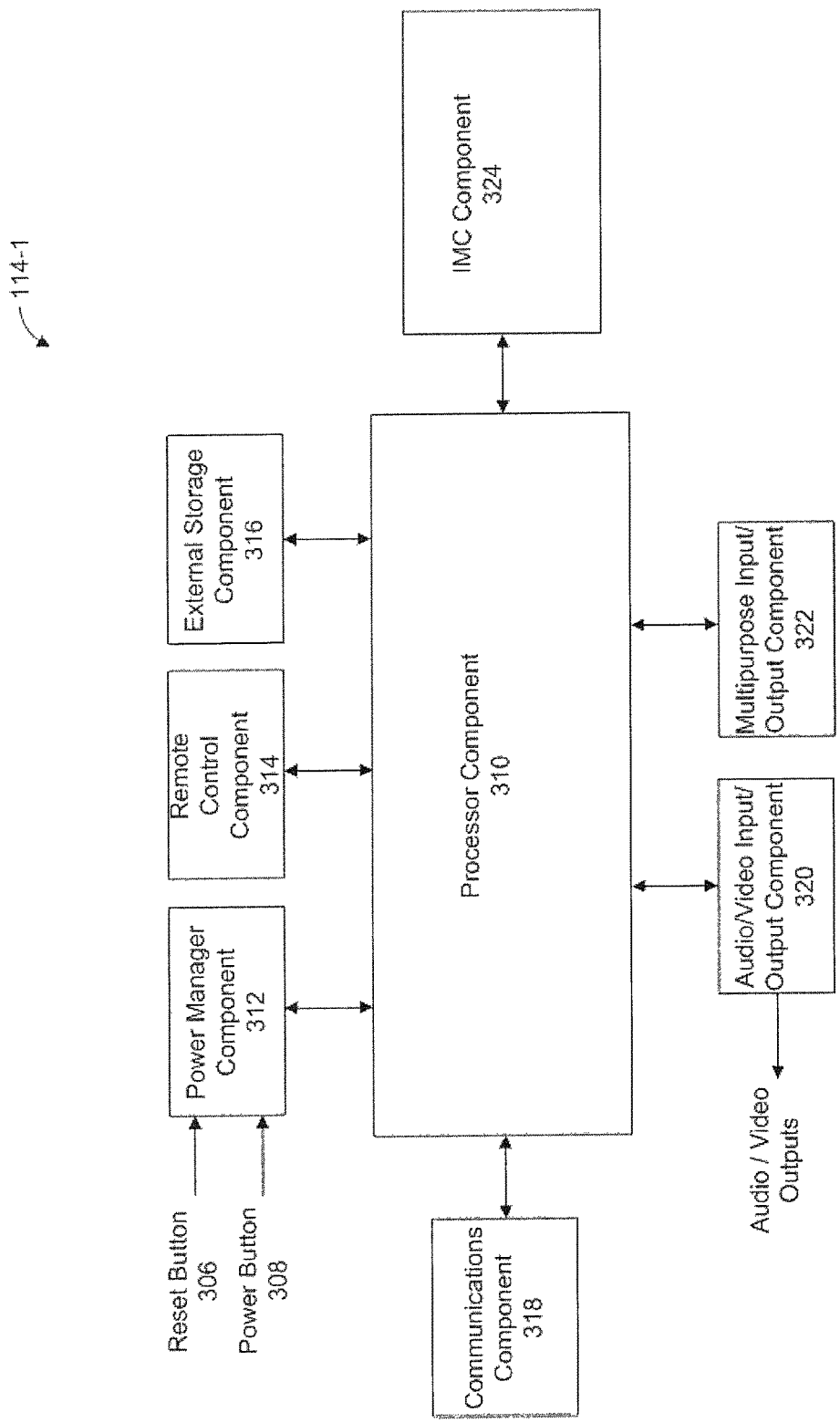
FIG. 3 illustrates a block diagram of an embodiment of the media device in an example embodiment.

FIG. 3 illustrates a block diagram of an embodiment of the media device 114-1 in an example embodiment. It can be appreciated that while FIG. 3 illustrates an embodiment for the media device 114-1, other media devices 114-*n* (e.g., media device 114-1, 114-2, etc.) can be configured substantially similar to the embodiment illustrated in FIG. 3 for media device 114-1.

In some embodiments, the media device 114-1 can be configured to communicate with its respective display devices 112-*n* and platform server device(s) 120-*n* and content source systems 130-*n* via network 150 in order to provide requested content for auditory graphical, and/or visual presentation on their respective display devices 112-*n*. The media device 114-1 can include, but is not limited to, IMC component 324, processor component 310, communications component 318, audio/video (A/V) input/output (I/O) component 320, multipurpose input/output (I/O) component 322, power manager component 312, remote control component 314, external storage component 316, each of the components can be operatively connected and/or coupled to each other.

In some embodiments, the processor component 310 can be generally arranged to execute instruction information including one or more instructions. In some embodiments, the processor component 310 can be a low power processor component or system-on-chip (SoC) processor component which can comprise, among other elements, processor circuit, which can include, but is not limited to, at least one set of electronic circuits arranged to execute one or more instructions. Examples of processor components 310 can include, but are not limited to, Qualcomm® Snapdragon®, Nvidia® Tegra®, Intel® Atom®, Samsung® Exynos, Apple® A7®, Apple® A8® or any other type of mobile processor(s) arranged to execute the instruction information including the one or more instructions stored in a memory.

In some embodiments, the IMC component 324 facilitates user bidding for the removal of IMC on media device 114-1. For example, IMC component can determine that IMC is associated with requested media content. Prior to or during display of the IMC, the IMC component 324 can cause media device 114-1 to present an option to the user to skip the IMC. The IMC component 324 can also determine a fee or current bid associated with the IMC to be removed or skipped by the user. When the user successfully exercises the option to skip or remove the IMC, IMC component 324 can prevent IMC from being presented or further presented to the user.

In some embodiments, prior to display of the IMC, the IMC component 324 can prevent the IMC from being presented or further presented to the user based on a bidding rule associated with a user. In some embodiments, prior to or during display of the IMC, the IMC component 324 can cause media device 114-1 to present an option to the user to skip the IMC based on a bidding rule associated with a user. Although IMC component 324 is discussed as a part of media device 114-1, embodiments of the invention are not limited thereto, and IMC component 324 can be located elsewhere, such as in platform server device(s) 120.

In some embodiments, the communications component 318 can be generally arranged to enable the media device 114-1 to communicate, directly and/or indirectly, with platform server device(s) 120, and/or content source systems 130-*n*. The communications component 318 can include, among other elements, a radio frequency circuit configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the communications component 318 can be further include network interface circuit encoding and/or decoding information and receiving and/or transmitting the encoded information as electrical and/or optical signals consistent with one or more wired and/or optical network standards (e.g., Ethernet, Fibre Channel, etc.).

In some embodiments, the power manager component 312 can be generally arranged to manage the media device 114-1 in one or more power states and transitioning between the one or more power states. The one or more power states can include, without limitation, reset state, sleep state, power on state, and/or power off state. The power management component 312 can further be can also be operatively coupled to a power button 306 to transition the media device 114-1 between powered on state, sleep state, and/or power off state. The power management component 312 can also be operatively coupled to a reset button 308 to transition the media device 114-1 to a reset state which can be followed by the power on state.

In some embodiments, the remote control component 314 can be generally arranged to receive user input information from control device 116-1. The remote control component 314 can be configured to use one or more wireless communication protocols and/or standards, which can include, without limitation, infrared (IR) protocols and/or standards, radio frequency (RF) protocols and/or standards, and/or Bluetooth protocol and/or standard to communicate with the control device 116-1.

In some embodiments, the external storage component 316 can be generally arranged to store information in volatile and/or nonvolatile memory. Additionally or alternatively, the external storage component 316 can be further operatively coupled to external storage components (not shown) such as, for example, USB memory, SSD, hard disk drives (HDD), secure digital (SD) nonvolatile memory, and the like. The stored information can include, without limitation, information received from platform server device(s) 120, content source systems 130-*n*, one or more components and/or operating systems stored a memory, information generated by the one or more components and/or operating systems stored in a memory, content, and/or the like.

In some embodiments, the A/V I/O component 320 can be generally arranged to communicate audio and/or video information operatively coupled to one or more components and/or devices. For example, the A/V I/O component 320 can be configured to output audio information and/or video information to display device 112-1 for acoustic, auditory, graphical, and/or visual presentation on the display device 112-1. The display device 112-1 can be operatively coupled and/or connected to the A/V IO component 320 via one or more audio and/or video interfaces.

In some embodiments, the one or more audio and/or video interfaces can include, without limitation, high definition multimedia interface (HDMI), display port (DP), Red-Green-Blue (RGB) component video, Separate Video (S-video), Digital Visual Interface (DVI), Video Graphics Array (VGA), Mobile High-Definition Link (MHL), composite video, analog audio, and/or Sony®/Philips® Digital interface (S/PDIF) digital audio, USB, Apple® Thunderbolt®, and/or the like.

In some embodiments, the multipurpose I/O component 322 can be generally arranged to communicate with one or more external devices via one or more interfaces. The one or more interfaces can include, without limitation, USB, Apple® Thunderbolt®, and/or the like. The one or more external devices (not shown) can include, without limitation, keyboards, mice, cameras, microphone, and the like.

In some embodiments, the operating system can include, without limitation, embedded operating systems (e.g., Apple®, iOS®, Google® Android®, HP® WebOS®, Microsoft® Windows Embedded®, Microsoft® Windows®, Linux, etc.) general arranged to manage hardware resources (e.g., one or more components of the media device 114-1) and/or software resources (e.g., one or more applications of the media device 114-1).

In some embodiments, a media application of media device 114-1 can be generally arranged to enable a user or consumer to authenticate to the platform server device(s) 120. After authentication, the media application can further enable a user or consumer to manage their user profile, and search, select, and/or playback of content received the platform server device(s) 120 and/or one or more content source systems 130-n. The media application can include, without limitation, an input component, a content component, an output component, and/or a search component.

In some embodiments, the input component can be generally arranged to interface with remote control component 314 and/or multipurpose I/O component 322 to receive user or consumer and/or process one or more commands including navigation commands and/or selection commands which can represent selection of content, search for content, and/or an ongoing interaction with an application executing on the platform server device(s) 120.

In some embodiments, the content component can be generally arranged to receive, buffer, store, and/or stream a user or consumer selected content from the platform server device(s) 120 and/or one or more content source systems 130-n. The content component can be also be generally arranged to provide the received, buffered, stored, and/or streamed content to display component for auditory, aural and/or graphical presentation on a display device (e.g., display device 112-1) operatively coupled to the media device 114-1.

In some embodiments, the output component can be generally arranged to generated audio and/or video information based on content received, buffered, stored, and/or streamed from platform server device(s) 120 and/or one or more content source systems 130-n. Additionally, the output component can also be generally arranged to generate audio and/or video information based on content stored in a memory and/or memory operatively coupled to the external storage component 316. The output component can be further arranged to generate the audio and/or video information based on customized UI information representative of one or more UI views (not shown) including one or more UI elements received from platform server device(s) 120 and/or generated by one or more components of a memory and/or operating system.

In some embodiments, the output component can be arranged to provide the generated audio and/or video information to a display device (e.g., display device 112-1) operatively coupled to the A/V I/O component 320 in order to aurally and/or graphically present at least a portion of the generated audio and/or video information on the display device (e.g., display device 112-1).

In some embodiments, the search component can be generally arranged to communicate with the platform server device(s) 120. In some embodiments, the search component can be configured to receive one or more search queries from the user or consumer via the input component, where each search query can include, without limitation, one or more search terms and/or phrases. The search component can be further configured to transmit the one or more search queries to the platform search component 124-2, where the platform search component 124-2 performs a search based on the received one or more search queries. The search component can be further configured to receive one or more search results from the platform search component 124-2, in response to the transmission of the one or more search queries.

Figure 4:
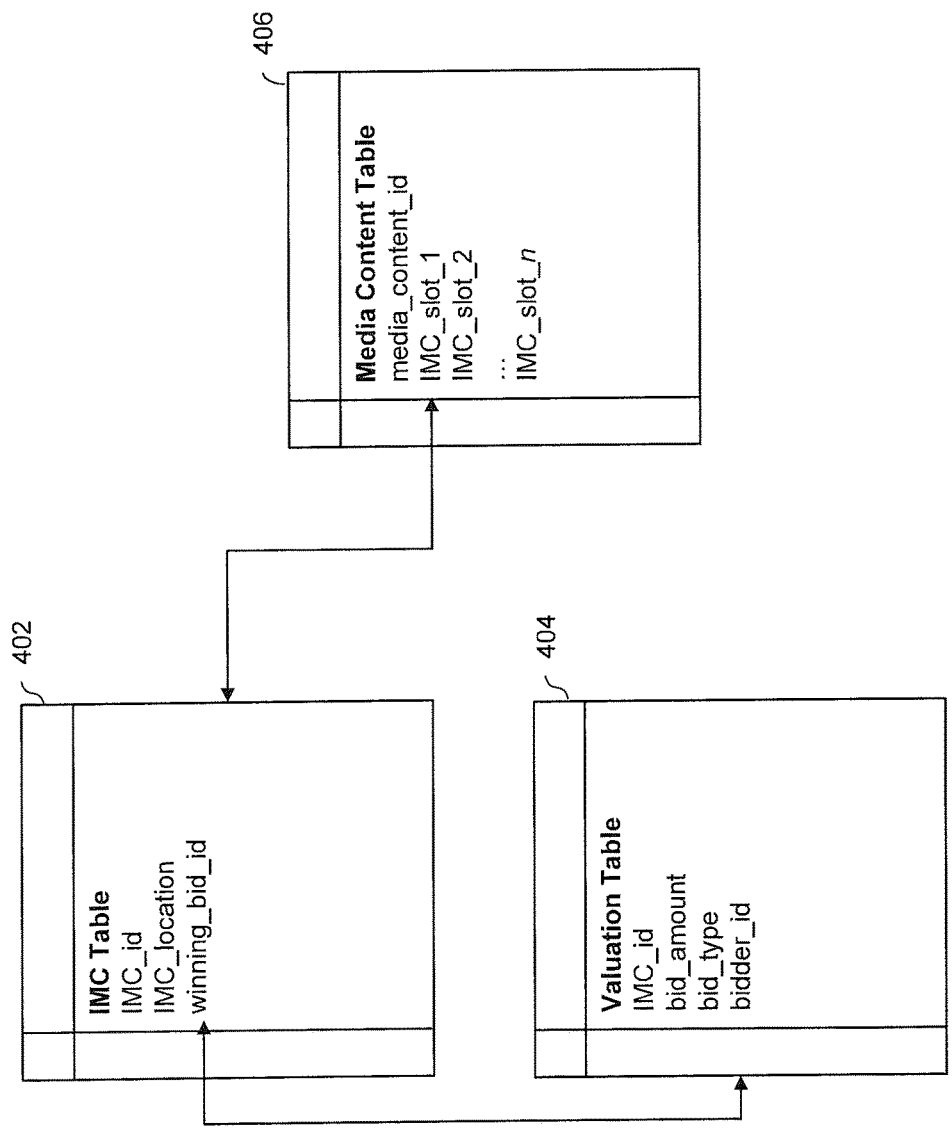
FIG. 4 illustrates a block diagram of example database tables, in accordance with one or more embodiments.

FIG. 4 illustrates a block diagram of example database tables including IMC table 402, valuation table 404, and media content table 406. IMC table 402 includes information relating to IMC. IMC table 402 includes the fields IMC_id, IMC_location, and winning_bid_id. The IMC_id field can store an identifier (such as a unique identifier, hash, digest, etc.) of a particular IMC. The IMC_location field can store information relating to the location of the IMC. For example, the IMC_location field can be a pointer, URL, and/or link to the location of the IMC on the corresponding content source system 130-n. The winning_bid_id field can store information that identifies the current winning bid corresponding to the IMC. For example, the winning_bid_id field may include information (such as a pointer or key) that identifies a corresponding entry in valuation table 404. In some embodiments, IMC table 402 is stored in IMC information collection 906, which is further described below.

Valuation table 404 includes the fields IMC_id, bid_amount, bid_type, and bidder_id. Valuation table 404 can store information corresponding to the bids placed for the presentation or display of IMC. The IMC_id field can store an identifier (such as a unique identifier, hash, digest, etc.) of a particular IMC. The bid_amount field can store an amount of a bid for the presentation or removal of content. The bid_type field can indicate whether the bid is for the presentation or removal of the corresponding IMC. The bidder_id field can include information that identifies the bidder that placed or is otherwise associated with the bid. In some embodiments, valuation table 404 is stored in IMC information collection 906, which is further described below.

Media content table 406 includes the fields media_content_id and IMC_slots 1-n. Media content table 406 includes information that identifies the media content to be displayed and the associated IMC. The media_content_id field can store an identifier (such as a unique identifier, hash, digest, etc.) of a particular media content. Platform server device(s) 120 can use the media_content_id to identify and retrieve the media content on the system. IMC_slots 1-n can store information relating to the IMC corresponding to the respective slot. For example, each IMC_slot field can be a pointer, URL, link, or any combination thereof to IMC entry in the IMC table 402. In some embodiments, media content table 406 is stored in content description information collection 908, which is further described below.

In some embodiments, the media_content_id field can store an identifier (such as a unique identifier, hash digest, etc.) of a bundle of related media content. For example, the media_content_id field may identify a series of episodes for a television series, a collection of movie titles by the same director, a particular genre of movies (e.g., drama movies), or movies from a particular decade (e.g., the 1990s). Platform server device(s) 120 can use the media_content_id field to identify and retrieve a particular media content item from the bundle of related media content on the system. In addition, platform server device(s) 120 can use the media_content_id field to track the bundle of related media content in order to provide a discounted bid for skipping or removing IMC. For example, a content provider can lower the bid amount to skip or remove IMC based on the bid being for a bundle of related media content (e.g., a series of episodes of a television series) as compared to a single media content item (e.g., an individual episodes of a television series). Thus, the content provider can lower the bid to skipping or remove IMC for users who are willing to watch the entire bundle of related media content (e.g., all the episodes of a television series).

FIG. 5 illustrates a block diagram of an example user bid profile table 502. User bid profile table 502 includes profile information for a user of a media control system. User bid profile table 502 may include the fields user_id, balance, bid_amount_1-*n*, and bid_media_content_id_1-*n*. The user_id field can store an identifier (such as a unique identifier, hash, digest, etc.) of a particular user in the media control system. The balance field can store the current amount available for bidding by the user. This can represent the amount the user is able to bid at any given time. In some embodiments, the balance field can store any amount of money, ranging from whole amounts to fractional amounts (e.g., cents). In some embodiments, the balance field can store reward points that represent a virtual currency.

The bid_amount_1-*n* and bid_media_content_id_1-*n* fields can together store one or more bidding rules for the user. Each bidding rule can represent the amount the user is willing to pay to skip or remove IMC associated with selected media content. Each bid_amount field may correspond to a respective bid_media_content field. Each bid_amount field can store an amount the user is willing to spend to skip or remove IMC associated with selected media content. In some embodiments, the bid_amount field can store any amount of money, ranging from whole amounts to fractional amounts (e.g., cents). In some embodiments, the bid_amount field can store reward points that represent a virtual currency. The bid_media_content_id field can store an identifier for media content of interest to the user. For example, each bid_media_content_id field can be a pointer, URL, link, or any combination thereof to a media_content_id entry in the media content table 406.

In some embodiments, a user can set bid rules in the corresponding user bid profile table 502 via one or more media devices 114-*n*, one or more control devices 116-*n*, one or more content administrator devices 142-*n*, or any combination thereof. Each bidding rule in user profile table 502 enables the user to perform automatic bidding when viewing content of interest (e.g., the content indicated in the bid_media_content_id field). Specifically, the user can select content of interest and, if a bidding rule is present in user bid profile table 502, a bid is made on behalf of the user according to the bidding process in FIG. 6 for the amount listed in the associated bid_amount field. This enables a user to potentially skip or remove IMC without having to interactively bid prior to, or during, viewing of the selected content.

In some embodiments, user bid profile table 502 can stored in platform data store 122. In some embodiments, user bid profile table 502 can be stored in the cloud. In some embodiments, user bid profile table 502 can be stored in the cloud and managed by a third party advertiser provider.

Figure 6:
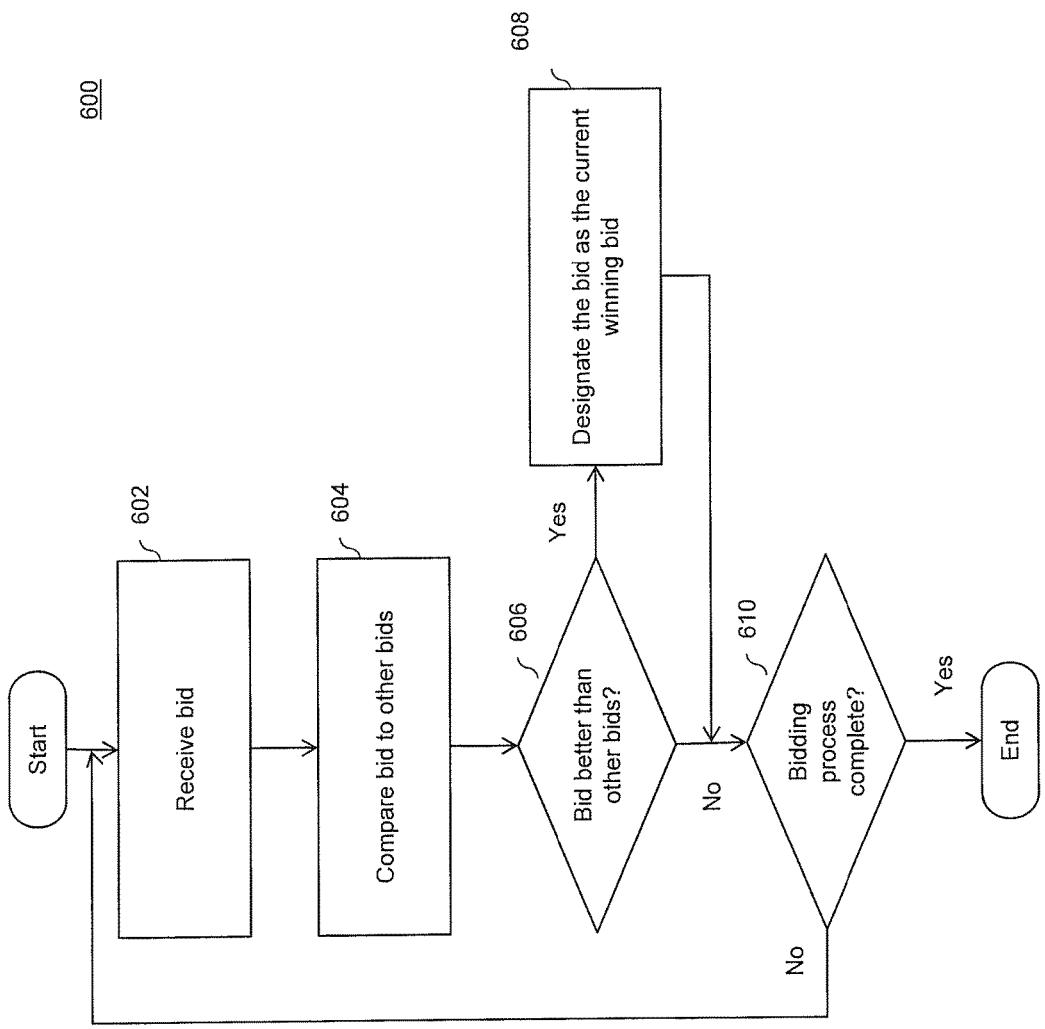
FIG. 6 illustrates a flowchart of an example method for determining a bid amount, in accordance with one or more embodiments.

FIG. 6 is a flowchart for a method 600 for determining a bid amount, according to an embodiment. Method 600 can be performed by processing logic that can comprise hardware (e.g., circuitry, dedicated logic, programmable logic, microcode, etc.), software (e.g., instructions executing on a processing device), or a combination thereof. In some embodiments, method 600 is performed by media platform server devices 120, which can be implemented by a computer system such as computer system 1200.

Method 600 starts and proceeds to block 602. At block 602, bids for the placement or removal of content are received to thereby establish the priority of such content. In some embodiments, media platform server device(s) 120 receive the bids. The bids can be received from content providers, content viewers, or any combination thereof. The bids can be for the right to deliver media content to media devices 114-*n*. The bids can also be for the right to prevent the delivery of media content to media device 114-*n*. For example, a user may bid to prevent advertisements from being displayed on the user's media devices 114-*n* while viewing a particular media content item. In some embodiments, the bids can be for the right to deliver media content (e.g. advertisements) associated with a bundle of related media content to media devices 114-*n*. In some embodiments, the bids can be for the right to prevent the delivery of media content to media device 114-*n* during viewing of a bundle of related media content (e.g., a series of episodes of a television series). The bids can be in any amount of money, ranging from whole amounts to fractional amounts (e.g., cents). In some embodiments, the bids can be reward points that represent a virtual currency. In some embodiments, the reward points can be bought using any amount of money, ranging from whole amounts to fractional amounts. In some embodiments, reward points may be exchanged between users.

In some embodiments, the bids correspond to placement or removal of a single piece of media content. In another embodiment, the bids can correspond to placement or removal of lots, groups, or multiple items or portions of media content.

In some embodiments, one or more content providers (such as advertisers) places a bid for the placement of media content (such as an advertisement). Content providers can place bids via one or more content administrator devices 142-*n*.

In some embodiments, bids are received from one or more users (such as content viewers) for the removal of content. In some embodiments, bids are received from one or more users (such as content viewers) for the removal content during playback of a bundle of related media content. Users can place bids via one or more media devices 114-*n*, one or more control devices 116-*n*, one or more content administrator devices 142-*n*, or any combination thereof.

In some embodiments, bids can be placed at one or more different time prior to or during the playback of the media content. For example, the bids can be placed in real-time during playback of the media content, prior to playback of the media content, or during both periods.

In some embodiments, bids can be placed automatically during selection of the media content for playback. For example, the bids can be placed according to a bid rule in user bid profile table 502 at selection the media content for playback.

In some embodiments, one or more bids, including real-time bids, can be delivered using a combination of technologies and facilitate near-instantaneous deliver of bids. For example, for each bid, an HTTP request can be sent to platform server device(s) 120 to open a connection to send the bid. Bid information, such as a bid amount, reference to the media content spot, content location information, content identifier information, status as for the placement or removal of media content, or any combination thereof can be formatted as an XML document. The XML information can be transmitted by a bidding device (e.g. content administrator devices 142-n, media devices 114-n, and/or control devices 116-n). Platform service device(s) 120 can provide the bidding device with a receipt and/or status of the placed bid.

In some embodiments, bids for the placement of content and/or the removal of content can be aggregated. For example, a media content provider may bid an amount for placement of media content. A number of users can also bid for the removal of the placement of media content, and the users' bids can be aggregated as a single bid to compete against the media content provider's bid. If the users' aggregate bid wins the bidding, the media content can be removed (e.g. removing an advertisement during programming) for the users.

In some embodiments, a bid can be for the placement of a bundle of related content. In some embodiments, a bid can be for removal of content for a bundle of related media content (e.g., a series of episodes of a television show).

At block 604, the received bid can be compared to one or more other bids. In some embodiments, platform server device(s) 120 receives compares the existing bids. Platform server device(s) 120 can compare the received bids depending on bidding parameters and/or the type of action. For example and as discussed above, In some embodiments, bids can be considered individually, or groups of bids (such as the bids for the removal of content and/or the bids for the placement of content) can be aggregated and viewed as a single bid for comparison purposes.

At block 606, it is determined whether the received bid is the current best bid. In some embodiments, platform server device(s) 120 determine whether the received bid is the current best bid based on the comparison performed at block 504. If the bid is determined to be the best bid, method 500 proceeds to block 608. Otherwise, method 600 proceeds to block 610.

At block 608, the received bid is designated as the current winning bid. In some embodiments, platform service device(s) 120 designate the received bid as the current winning bid. The received bid can be designated as the current winning bid in platform datastore 122, such as in IMC table 402. The designation can include a reference to content identifier information and/or content location information for the media content associated with the bid. This information can be used for delivering media content associated with the bid. Method 600 then proceeds to block 610.

At block 610, it is determined whether the bidding process is complete. In some embodiments, platform server device(s) 120 determine whether the bidding process is complete. The determination can be made based on one or more bidding parameters and/or the type of auction. For example, if the bidding period is restricted by time, such as an absolute time or relative to a time that an event takes place (such as the playback of other media content), the platform server device(s) 120 determine if the time period has expired. If it is determined that the bidding process is complete, method 600 ends. Otherwise, method 600 proceeds to block 602.

Figure 7:
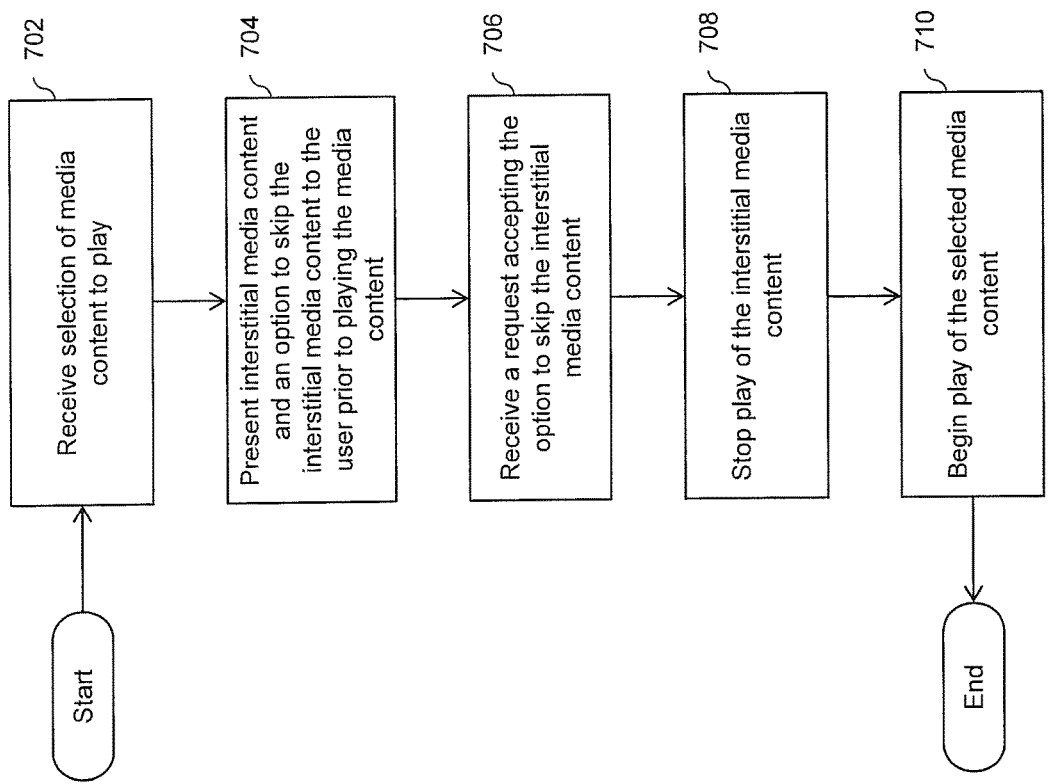
FIG. 7 illustrates a flowchart of an example method for controlling media content, in accordance with one or more embodiments.

FIG. 7 is a flowchart for a method 700 for controlling media content, according to an embodiment. Method 700 can be performed by processing logic that can comprise hardware (e.g., circuitry, dedicated logic, programmable logic, microcode, etc.), software (e.g., instructions executing on a processing device), or a combination thereof. In some embodiments, method 600 is performed by platform server device(s) 120, which can be implemented by a computer system such as computer system 1200.

Method 700 starts and proceeds to block 702. At block 702, a selection of first media content to play is received. In some embodiments, platform server device(s) 120 receives the selection of first media content to play. The selection can be received from one or more media devices 114-n, one or more control devices 116-n, and/or from platform server device(s) 120 themselves. Method 600 then proceeds to block 604.

At block 704, IMC and an option to skip the IMC is presented to a user prior to playing the selected first media content. In some embodiments, platform server device(s) 120 delivers the ICM and transmits the option to skip the ICM to one or more media devices 114-n. Media devices 114-n cause the IMC and option to skip the IMC to be presented to the on the playback device, such as on media devices 114-n and/or display devices 112-n. The IMC and option to the skip the IMC can be presented simultaneously.

In some embodiments, the option to skip the IMC can be an offer to skip the IMC in exchange for a fee. The fee can be based on an amount bid by a content provider to have the IMC placed. The IMC can be a single advertisement, multiple advertisements, ad pod, set of advertisements interspersed throughout different portions of the selected media content, or any combination thereof.

In some embodiments, the transaction fee to skip the IMC can set in different ways. The fee can be fixed or variable. If the fee is variable, the fee can be time-based and decrease continuously or incrementally as the IMC is played. For example, at the beginning of a 15 second advertisement, the fee to skip the advertisement might be set as $0.15. As each second of the advertisement is played, the fee might decrease $0.01 correspondingly. Alternatively or additionally, the fee can decrease continuously or incrementally according to metadata skip value associated with the IMC. Alternatively or additionally, fees can be paid prior to being prompted with the option to skip the IMC by including a preference in a subscription or by identifying that the selected media content is to be presented without the IMC. Details regarding the transaction fee and the accepted transaction fee can be stored in platform datastore 122, such as in valuation table 404. In some embodiments, the transaction fee is determined using a bidding process, such as the bidding process discussed in the context of FIG. 6.

In some embodiments, a user accepts the offer to skip the IMC using one or more media devices 114-n, one or more control devices 116-n, and/or one or more content administrator devices 142-n. The accepting device can send a request (e.g. an XML data using HTTP) platform server device(s) 120 to accept the offer. The offer can be transmitted using a real-time protocol (RTP) to ensure that the offer is timely accepted. The acceptance can include the transaction fee associated with the offer.

At block 706, a request accepting the option to accept the offer to skip the IMC is received. In some embodiments, platform server device(s) 120 receive the request accepting the option to accept the offer to skip the IMC. Upon receiving the request, platform server device(s) 120 can update the platform datastore 122 to reflect debit the user's account based on the accepted offer.

At block 708, playback of the IMC is stopped. In some embodiments, platform server device(s) 120 can stop the playback of the IMC by issuing a command to the media devices 114-n.

At block 710, playback of the selected media content begins. In some embodiments, platform server device(s) 120 instructions one or more media devices 114-n to begin playback of the selected content. In some embodiments, all or some of selected media content can be preloaded so that playback of the selected media appears to occur instantaneously to the user after the user accepts the offer to skip the IMC. Method 700 then ends.

FIG. 8 is a flowchart for a method 800 for controlling display of media content, according to an embodiment. Method 800 can be performed by processing logic that can comprise hardware (e.g., circuitry, dedicated logic, programmable logic, microcode, etc.), software (e.g., instructions executing on a processing device), or a combination thereof. In some embodiments, method 800 is performed by platform server device(s) 120, which can be implemented by a computer system such as computer system 1200.

Method 800 starts and proceeds to block 702, the details of which have been discussed above in the context of FIG. 7. Method 800 then proceeds to blocks 802 and 804.

At block 802, the IMC is presented to a user prior to playing the selected media content. In some embodiments, platform server device(s) 120 delivers the ICM to one or more media devices 114-*n*. Media devices 114-*n* cause the IMC the playback device, such as on media devices 114-*n* and/or display devices 112-*n*. Presentation of the IMC can be performed using the approaches discussed above regarding block 704.

At block 804, an option to skip the IMC is presented to a user prior to playing the selected first media content. In some embodiments, platform server device(s) 120 transmits the option to skip the ICM to one or more control devices 116-*n*. The option to skip the IMC can be presented to the on the one or more control devices 116-*n*. Presenting the offer to skip the IMC and the IMC on separate devices allows the IMC to be presented unobstructed by the offer to skip the IMC while retaining the user's ability to accept the offer to skip the IMC. The IMC and option to the skip the IMC can be presented simultaneously.

In some embodiments, a user accepts the offer to skip the IMC using one or more control devices 116-*n*. The e or more control devices 116-*n* can send a request (e.g. an XML data using HTTP) platform server device(s) 120 to accept the offer. The offer can be transmitted using a real-time protocol (RTP) to ensure that the offer is timely accepted. The acceptance can include the transaction fee associated with the offer.

Method 800 then proceeds to blocks 708 and 710, the details of which have been discussed above in the context of FIG. 7. Method 800 then ends.

Figure 9:
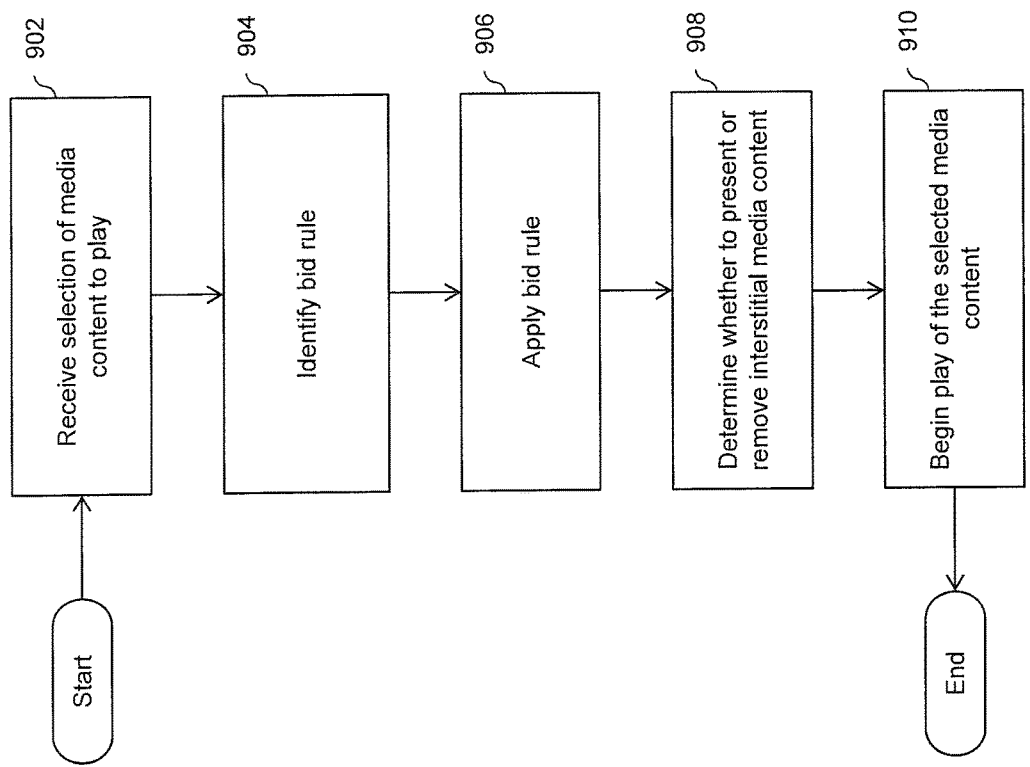
FIG. 9 illustrates a flowchart of an example method for controlling media content, in accordance with one or more embodiments.

FIG. 9 is a flowchart for a method 900 for controlling display of media content, according to some embodiments. Method 900 can be performed by processing logic that can comprise hardware (e.g., circuitry, dedicated logic, programmable logic, microcode, etc.), software (e.g., instructions executing on a processing device), or a combination thereof. In some embodiments, method 900 is performed by platform server device(s) 120, which can be implemented by a computer system such as computer system 1200.

At block 902, a selection of first media content to play is received. In some embodiments, platform server device(s) 120 receives the selection of first media content to play. The selection can be received from one or more media devices 114-*n*, one or more control devices 116-*n*, and/or from platform server device(s) 120 themselves. In some embodiments, the selection of first media content to play may be for a bundle of related media content (e.g., a series of episodes of a television show). Method 900 then proceeds to block 904.

At block 904, platform server device(s) 120 determines a bid rule associated with the selection of the first media content to play. Specifically, platform server device(s) 120 may identify the bid rule based on the presence of the selection of the first media content to play in a bid_media_content_id field in a user bid profile table 502 for the requesting user. If the selection of the first media content is present in a bid_media_content_id field, method 900 proceeds to block 906.

At block 906, platform server device(s) 120 compares the bid_amount field of the associated bid_media_content_id field to the current bid amount for the selection of the first media content using a bidding process, such as the bidding process discussed in the context of FIG. 6. If the value in the bid_amount field is greater than the balance field in user bid profile table 502 and the current bid amount for the selection of the first media content, method 900 then proceeds to block 908.

At block 908, platform server device(s) 120 presents or removes IMC associated with the selection of the first media content. In some embodiments, the platform server device(s) 120 presents or removes the IMC based on the bid_type field associated with the IMC in valuation table 404. Method 900 then proceeds to block 910.

At block 910, platform server devices(s) 120 plays the selection of the first media content to the user. In some embodiments, the IMC is presented, or is not presented, with the first media content selection based on block 908. In some embodiments, platform server device(s) 120 may update the balance field in the user bid profile table 502. Specifically, platform server device(s) 120 may subtract the value in the bid_amount field from the balance field in the user bid profile table 502.

FIG. 10 illustrates a block diagram of one or more platform applications configured according to an example embodiment. In some embodiments, the one or more platform applications 124-*n* can be stored in one or more platform server devices 120 and arranged for execution by the one or more platform server devices 120.

In some embodiments, each platform application (e.g., platform application 124-1, platform application 124-2, etc.) can include, without limitation, one or more platform components. The one or more platform components can further include, without limitation, platform authentication component (e.g., platform authentication component 1010-1, etc.), platform search component (e.g., platform search component 1012-1, etc.), platform user Interface (UI) component (e.g., platform user Interface (UI) component 1014-1, etc.), platform content component (e.g., platform content component 1016-1, etc.), platform command component (e.g., platform command component 1018-1, etc.), platform datastore component (e.g., platform datastore component 1020-1, etc.), and/or any other platform component.

In some embodiments, each platform application (e.g., platform application 124-1, platform application 124-2, etc.) can be associated with a specific version or revision. The specific version or revision can be representative of a specific configuration of the platform application and its associated components (e.g., platform authentication component 1010-1, platform search component 1012-1, etc.). Additionally or alternatively, each version of a platform application (e.g., platform application 124-1 configured as a first version of the platform application, etc.) can be further configured to communicate and interface with one or more associated versions of a media device (e.g., media device 114-1 configured as a first version of the media device, etc.).

For example, the platform application 124-1 can be configured as a first version of a platform application. The platform application 124-1 can be further configured to communicate and interface with media device 114-1 which can be configured as a first version of a media device. Similarly, the platform application 124-2 can be configured as a second version of the platform application. The platform application 124-2 can also be configured to communicate and interface with media device 114-2 which can be configured as a second version of the media device.

In some embodiments, the platform authentication component (e.g., platform authentication component 1010-1, etc.) can be arranged to communicate with one or more associated versions of media devices 114-n and authenticate one or more users or consumers based on provided authentication information associated with the respective media devices 114-n. The authentication information can include information that enables a platform authentication component (e.g., platform authentication component 1010-1, etc.) to authenticate, authorize, and enable a user or consumer to securely connect to the platform application (e.g., platform application 124-1) and access content stored in the content source systems 130-n for a particular user, consumer, and/or media device (e.g., media device 114-1, etc.).

In some embodiments, the authentication information can include, without limitation, login/user name, password, device identifier, IP addresses, email address, and/or the like. The authentication information can be stored in the platform datastore 122 as further discussed in FIG. 9. Once authenticated, the platform application 124 can enable the user or consumer to purchase, search, retrieve, or otherwise access content stored in content systems 130-n.

In some embodiments, the platform search component (e.g., platform search component 1012-1, etc.) can be arranged to receive search requests from associated versions of media devices 114-n to search for content and/or indexed information within content and provide search results to respective media devices 114-n that transmitted a search request. The search requests can include, without limitation, one or more search terms and/or phrases representative of one or more words, phrases, and/or sentences. In some embodiments, the platform search component (e.g., search component 1012-1, etc.) can be configured to match the one or more search terms and/or phrases or their equivalents (e.g., synonyms, etc.) utilizing for example, one or more search algorithms including natural language search algorithms, with content description information stored in the platform datastore 122.

In some embodiments, the UI component (e.g., UI component 1014-1, etc.) can be arranged to generate customized UI information for associated versions of the one or more media devices 114-n. The generated customized UI information can include content such as, for example, audio, visual, and/or gaming content for selection by the consumers or users of the one or more media devices 114-n utilizing, for example, respective control devices 116-n. The UI component (e.g., UI component 1014-1, etc.) can be further configured to provide the generated UI information to respective media devices 114-n for graphical and/or aural presentation via the respective display devices 114-n, which can enable a consumers or users to select and/or access content from the content source systems 130-n.

In some embodiments, the platform content component (e.g., platform content component 1016-1) can be arranged to receive requests from associated versions of one or more media devices 114-n to access content stored in content source systems 130-n and provide the requested content directly to the media device 114-n as previously discussed based on user subscription information stored in platform datastore 122 and further discussed with respect to FIG. 9. Additionally or alternatively, the content component 124-5 can provide a response, where the response includes, without limitation, content location information. The content location information can include, without limitation, a network address and/or path of a particular content stored within the content datastores 134-n, so that the requesting media device (e.g., media device 114-1, etc.) can request to access the content and receive the content from content source system 130-n based on user subscription information stored in platform datastore 122 and further discussed with respect to FIG. 9.

In some embodiments, the platform command component (e.g., platform command component 1018-1, etc.) can be arranged to process the command information received from associated versions media devices 114-n. The command information received from the media devices 114-n can include, without limitation, navigation commands and/or selection commands which can represent selection of content, request to access content, search for content, and/or an ongoing interaction with an application executing on the one or more platform server devices 120.

In some embodiments, the platform datastore component (e.g., platform datastore component 1020-1, etc.) can be generally arranged to provide datastore access to one or more components of the platform application and can include, without limitation, a datastore access component 1024-1, a key gen component 1026-1, and a cache isolator component 1028-1.

In some embodiments, the datastore access component 1024-1 can be arranged to process one or more platform read requests and/or platform update requests with respect to information stored in the platform datastore 122 from one or more components of a platform application (e.g., platform application 124-1) and/or one or more media devices (e.g., media device 114-1, etc.). In response to the platform read requests, the datastore access component 1024-1 can be configured to access the platform datastore 122 to retrieve the requested information, request to cache the retrieved information as a data item in the shared cache application 126, and provide the data item to the requesting components and/or requesting device. In response to the platform update requests, the datastore access component 1024-1 can be configured to update the platform datastore 122 with updated information, update the data item cached by the shared cache application 126, and isolate a specific version of the data item cached within the shared cache application 126.

In some embodiments, the key gen component 1026-1 can be configured to generate a data item key based on a version agnostic identifier associated with a data item and a version specific identifier associated with a version of a platform application and/or media device.

In some embodiments, the cache isolator component 1028-1 can be configured to isolate one or more versions of data items cached by the shared cache application. To isolate a version of a data item, the cache isolator component 1028-1 can be configured to determine one or more other versions of the platform application and/or media device, i.e., other versions of the platform application and/or media device excluding the version that is associated with the data item to be isolated. The cache isolator component 1028-1 can be further configured to remove the one or more other versions of data items from a shared cache memory.

In some embodiments, the key gen component 1024-1 for a platform application (e.g., platform application 124-1, etc.) can be similarly configured with respect to other key gen components (e.g., key gen component 1024-2 of plat form application 124-2, etc.) so that any of the one or more versions of the platform application 124-*n* can locate or find data item keys generated by any other version of the of the platform application 124-*n*. The cache isolator component 1028-1 for each platform application 124-*n* can also be similarly configured with respect to other cache isolator components (e.g., cache isolator component 1028-2 of platform application 124-2, etc.), so that any of the one or more versions of the platform application 124-*n* can remove obsolete cache data items generated and cached by other versions of the platform application 124-*n*.

FIG. 11 illustrates a block diagram of an embodiment of the platform datastore 122 of platform server device(s) 120. In particular, the platform datastore 122 can be implemented in the platform server device(s) 120 and/or stored in the platform server device(s) 120.

In some embodiments, the platform datastore 122 can include, without limitation, user profile information collection 1102, user subscription information collection 1104, IMC information collection 1106, and/or content description information collection 1108.

In some embodiments, the user profile information collection 1102 can include a collection of user profile information for each user or consumer. The user profile information can include, without limitation, authentication information (e.g., login/user name, etc.) as previously discussed and demographic information. The demographic information can include personal information associated with a particular user or consumer which can include, without limitation, name and address information, date of birth information, age and gender information, and/or the like.

In some embodiments, the user subscription information collection 1104 can include a collection of user subscription information for each user or consumer. The user subscription information can include purchased or otherwise authorized content of a user or consumer, and the one or more content source systems 130-*n* that the purchased or otherwise authorized content is available to the user or consumer. It can be appreciated that the user subscription can be further associated or linked to the particular user profile information for that user or consumer.

In some embodiments, the IMC information collection 1106 can include a collection of IMC information for IMC associated with media content. The IMC information can include one or more identifiers of IMC, one or more locations of IMC, one or more bid amounts for IMC, one or more bid statuses for IMC, one or more bidder identifiers associated with IMC, and/or the like.

In some embodiments, the content description information collection 1108 can include a collection of content description information for each content. As previously discussed, the content description information can include without limitation, content identifier information (e.g., hash, digest, etc.) that uniquely identifies a specific content accessible from one or more content source systems 130-*n*, content title information identifying the title of the content, content author information identifying authors of the content, content language information identifying one or more languages of the audio or acoustic portions and/or visual or graphical portions of the content, time information identifying the total length of time of the content, content artist information identifying one or more artists and/or actors of the content, production information identifying the entities, producers, and/or persons that produced the content, content location information identifying one or more network addresses and/or paths of the respective content source systems 130-*n* that the specific content is accessible, content episode information identifying an episode the content belongs to, one or more IMC slots associated with the content, content season information identifying a season the content belongs to, content album information identifying an album the content belongs to.

Example Computer System

Various embodiments and/or components therein can be implemented, for example, using one or more well-known computer systems, such as, for example, platform server device(s) 120, client devices 110-*n*, display devices 112-*n*, server devices 132-*n*, and/or content administrator devices 142-*n* shown in FIG. 1. Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 can include one or more levels of cache. Main memory 1208 has stored therein control logic (i.e., computer software) and/or data.

Computer system 1200 can also include one or more secondary storage devices or memory 1210. Secondary memory 1210 can include, for example, a hard disk drive 1212 and/or a removable storage device or drive 1214. Removable storage drive 1214 can be a floppy disk drive, a magnetic tape drive, a compact disk drive, an optical storage device, tape backup device, and/or any other storage device/drive.

Removable storage drive 1214 can interact with a removable storage unit 1218. Removable storage unit 1218 includes a computer usable or readable storage device having stored thereon computer software (control logic) and/or data. Removable storage unit 1218 can be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 can include other means, instrumentalities or other approaches for allowing computer programs and/or other instructions and/or data to be accessed by computer system 1200. Such means, instrumentalities or other approaches can include, for example, a removable storage unit 1222 and an interface 1220. Examples of the removable storage unit 1222 and the interface 1220 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 can further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 can allow computer system 1200 to communicate with remote devices 1228 over communications path 1226, which can be wired and/or wireless, and which can include any combination of LANs, WANs, the Internet, etc. Control logic and/or data can be transmitted to and from computer system 1200 via communication path 1226.

In some embodiments, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Figure 12:
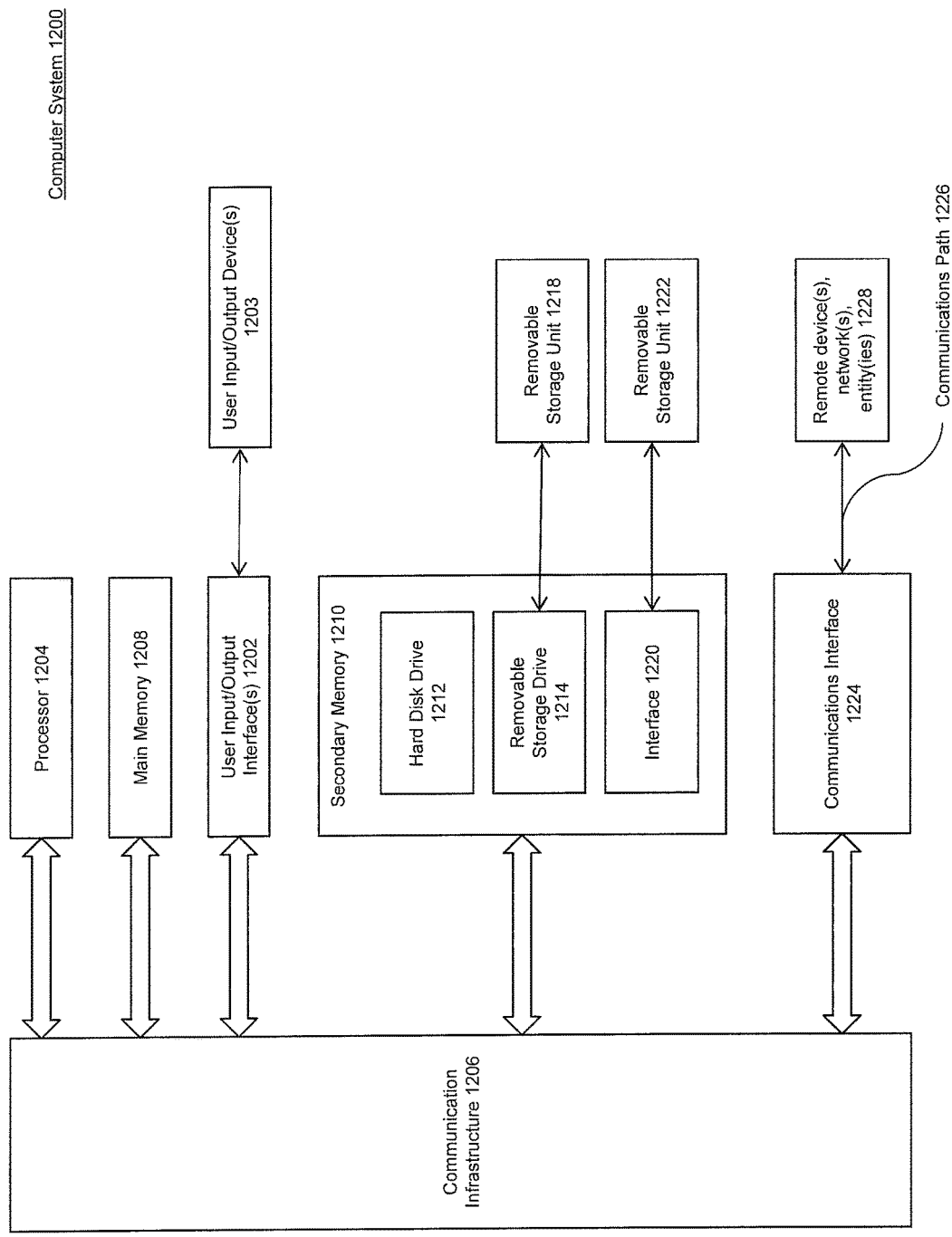
FIG. 12 illustrates an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 12. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A system comprising:
   at least one processor; and
   a memory operatively coupled to the at least one processor, the processor configured to:
     receive a selection of media content for playback;
     present interstitial media content on a first device prior to playing the media content;
     transmit an option to skip the interstitial media content to a second device, wherein the option to skip is associated with a first bid value inputted by a user;
     receive a request to skip the interstitial media content from the second device, wherein the request to skip is based at least in part on the first bid value and a priority value associated with a type of the interstitial media content;
     stop presentation of the interstitial media content on the first device based at least in part on the request to skip; and
     present the selected media content on the first device.

2. The system of claim 1, wherein the second device presents the option to skip to the user and generates the request to skip the interstitial media content in response to receiving acceptance of the option to skip by the user.

3. The system of claim 1, wherein the first device is a media playback device and the second device is a control device.

4. The system of claim 1, wherein the request to skip the interstitial media content is received using a real-time protocol.

5. The system of claim 1, wherein the interstitial media content and the option to skip the interstitial media content are presented concurrently.

6. The system of claim 1, wherein the request to skip is based at least in part on the first bid value being greater than a second bid value inputted by a provider of the selected media content.

7. The system of claim 1, wherein the request to skip is based at least in part on an aggregate bid value and a second bid value inputted by a provider of the selected media content, wherein the aggregate bid value is based at least in part on the first bid value and a third bid value inputted by a second user.

8. The system of claim 1, wherein the first bid value is inputted by the user in real-time during playback of the media content.

9. A computer implemented method, comprising:
receiving, by at least one computer system, a selection of media content for playback;
determining, by the at least one computer system, to present interstitial media content on a device based at least in part on the selected media content, a first bid value inputted by a user, and a priority value associated with a type of the interstitial media content;
stopping, by the at least one computer system, presentation of the interstitial media content on the device based at least in part on the determining; and
presenting, by the at least one computer system, the selected media content on the device.

10. The computer implemented method of claim 9, wherein the device is a media playback device.

11. The computer implemented method of claim 9, the stopping further comprising:
stopping presentation of the interstitial media content on the device prior to playing the selected media content.

12. The computer implemented method of claim 9, the determining further comprising:
determining to present the interstitial media content on the device based at least in part on the user of the device.

13. The computer implemented method of claim 9, the determining further comprising:
determining to present the interstitial media content on the device based at least in part on the first bid value being greater than a second bid value inputted by a provider of the selected media content.

14. The computer implemented method of claim 9, the determining further comprising:
determining to present the interstitial media content on the device based at least in part on an aggregate bid value and a second bid value inputted by a provider of the selected media content, wherein the aggregate bid value is based at least in part on the first bid value and a third bid value inputted by a second user.

15. The computer implemented method of claim 9, wherein the first bid value is inputted by the user in real-time during playback of the media content.

16. A non-transitory, tangible computer-readable device having instructions stored thereon that, when executed by at least one computing device, causes the at least one computing device to perform operations comprising:
receiving a selection of media content for playback;
presenting interstitial media content on a first device prior to playing the media content;
transmitting an option to skip the interstitial media content to a second device, wherein the option to skip is associated with a first bid value inputted by a user;
receiving a request to skip the interstitial media content from the second device, wherein the request to skip is based at least in part on the first bid value and a priority value associated with a type of the interstitial media content;
stopping presentation of the interstitial media content on the first device based at least in part on the request to skip; and
presenting the selected media content on the first device.

17. The computer-readable device of claim 16, wherein the second device presents the option to skip to the user and generates the request to skip the interstitial media content in response to receiving acceptance of the option to skip by the user.

18. The computer-readable device of claim 16, wherein the first device is a media playback device and the second device is a control device.

19. The computer-readable device of claim 16, wherein the request to skip the interstitial media content is received using a real-time protocol.

20. The computer-readable device of claim 16, wherein the interstitial media content and the option to skip the interstitial media content are presented concurrently.

* * * * *